US012738686B2

(12) United States Patent
Mori et al.

(10) Patent No.: US 12,738,686 B2
(45) Date of Patent: Sep. 15, 2026

(54) CONNECTOR

(71) Applicant: YAZAKI CORPORATION, Tokyo (JP)

(72) Inventors: Yuki Mori, Tochigi (JP); Shigeo Mori, Shizuoka (JP); Shinsuke Aoshima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 357 days.

(21) Appl. No.: 18/659,474

(22) Filed: May 9, 2024

(65) Prior Publication Data

US 2024/0388036 A1 Nov. 21, 2024

(30) Foreign Application Priority Data

May 15, 2023 (JP) ................................ 2023-080052

(51) Int. Cl.
*H01R 13/53* (2006.01)
*H01R 13/52* (2006.01)
*H01R 13/533* (2006.01)

(52) U.S. Cl.
CPC ....... *H01R 13/533* (2013.01); *H01R 13/5213* (2013.01)

(58) Field of Classification Search
CPC .. H01R 13/533; H01R 13/5213; H01R 11/12; H01R 2103/00; H01R 4/34; H01R 2201/26; H01R 13/02; H01R 13/40; H01R 13/502; B60L 53/16; B60L 53/302; B60L 53/18; H05K 5/0214; H05K 7/20127
See application file for complete search history.

(56) References Cited

U.S. PATENT DOCUMENTS

| | | | | |
|---|---|---|---|---|
| 11,622,473 | B2 * | 4/2023 | Chiang ................ | G02B 6/4269 439/487 |
| 11,749,951 | B2 * | 9/2023 | Wang ................. | H01R 13/6658 439/607.01 |
| 12,142,871 | B2 * | 11/2024 | Uki ...................... | H01R 13/533 |
| 2022/0140524 | A1 * | 5/2022 | Duenkel ................. | B60L 53/16 439/191 |
| 2022/0153155 | A1 | 5/2022 | Garcia-Ferre et al. | |
| 2023/0119572 | A1 * | 4/2023 | Fuehrer ................. | B60L 53/302 439/485 |
| 2024/0313432 | A1 * | 9/2024 | Yamaguchi ............ | H01R 4/183 |
| 2025/0141256 | A1 * | 5/2025 | Janowski ................. | B62J 43/13 |
| 2025/0388103 | A1 * | 12/2025 | Cunningham ........ | B60L 53/302 |

FOREIGN PATENT DOCUMENTS

JP 2023-003377 A 1/2023

* cited by examiner

*Primary Examiner* — Truc T Nguyen
(74) *Attorney, Agent, or Firm* — Sughrue Mion, PLLC

(57) ABSTRACT

A connector includes a power terminal, an LA terminal, a second housing portion, a heat storage member, and a cover. The power terminal is to be electrically connected to a mating terminal. The LA terminal is to be electrically connected to a cable. The heat storage member is erected at a connection portion between the power terminal and the LA terminal. The second housing portion includes a second housing space that houses the heat storage member. The cover sheathes an upper end opening of the second housing portion. The cover has a vent hole that penetrates the cover and communicates with the second housing space. The vent film is provided to the vent hole.

5 Claims, 5 Drawing Sheets

CONNECTOR

CROSS-REFERENCE TO RELATED APPLICATIONS

The present application is based on, and claims priority from the prior Japanese Patent Application No. 2023-080052, filed on May 15, 2023, the entire contents of which are incorporated herein by reference.

TECHNICAL FIELD

The disclosure relates to a connector.

BACKGROUND

Conventionally, electric power is supplied from the outside of a vehicle to a battery mounted on the vehicle via a charging connector attached to the vehicle.

In the charging connector, when current flows through a terminal during charging, Joule heat is generated to increase the temperature (operating temperature) of the terminal. In particular, in the case of quick charging, since a high current flows through the terminal, the temperature of the terminal increases significantly. Therefore, in the charging connector, there is a demand for reducing the increase of the temperature of the terminal at the time of power distribution.

In a connector disclosed in JP 2023-3377 A, a heat storage member is provided to a terminal. With this configuration, the heat storage member is used to absorb the heat generated at the terminal, so that the increase of the temperature of the terminal at the time of power distribution can be reduced.

SUMMARY OF THE INVENTION

However, in the connector disclosed in JP 2023-3377 A, from the viewpoint of waterproofing and the like, the housing space in which the heat storage member is housed is sealed and isolated from the outside.

For this reason, heat is accumulated in the portion where the heat storage member is housed, and the heat capacity of the heat storage member may be saturated in a short time. When the heat capacity of the heat storage member is saturated, the heat storage member cannot absorb the heat generated at the terminal.

This may make it impossible to reduce the increase of the temperature of the terminal at the time of power distribution, and further improvement has been required.

The disclosure has been made in view of such problems of the conventional art. An object of the disclosure is to provide a connector capable of preventing the heat capacity of a heat storage member from being saturated in a short time and effectively reducing an increase of the temperature of a terminal at the time of power distribution.

A connector according to an aspect of the embodiment includes a terminal connection unit to be electrically connected to a mating terminal, a cable connection unit to be electrically connected to a cable, a first housing portion that includes a first housing space that houses a connection portion between the terminal connection unit and the cable connection unit, a heat storage member that is erected at the connection portion, a second housing portion having a tubular shape that includes a second housing space that communicates with the first housing space and houses the heat storage member, and a cover that sheathes an upper end opening of the second housing portion. The cover includes a main body portion that has a vent hole that penetrates the cover and communicates with the second housing space, and a vent film that is provided to the vent hole, allows gas to pass through the vent hole, and prevents liquid from passing through the vent hole.

According to the embodiment, it is possible to provide a connector capable of preventing the heat capacity of a heat storage member from being saturated in a short time and effectively reducing an increase of the temperature of a terminal at the time of power distribution.

DETAILED DESCRIPTION OF THE INVENTION

Figure 1:
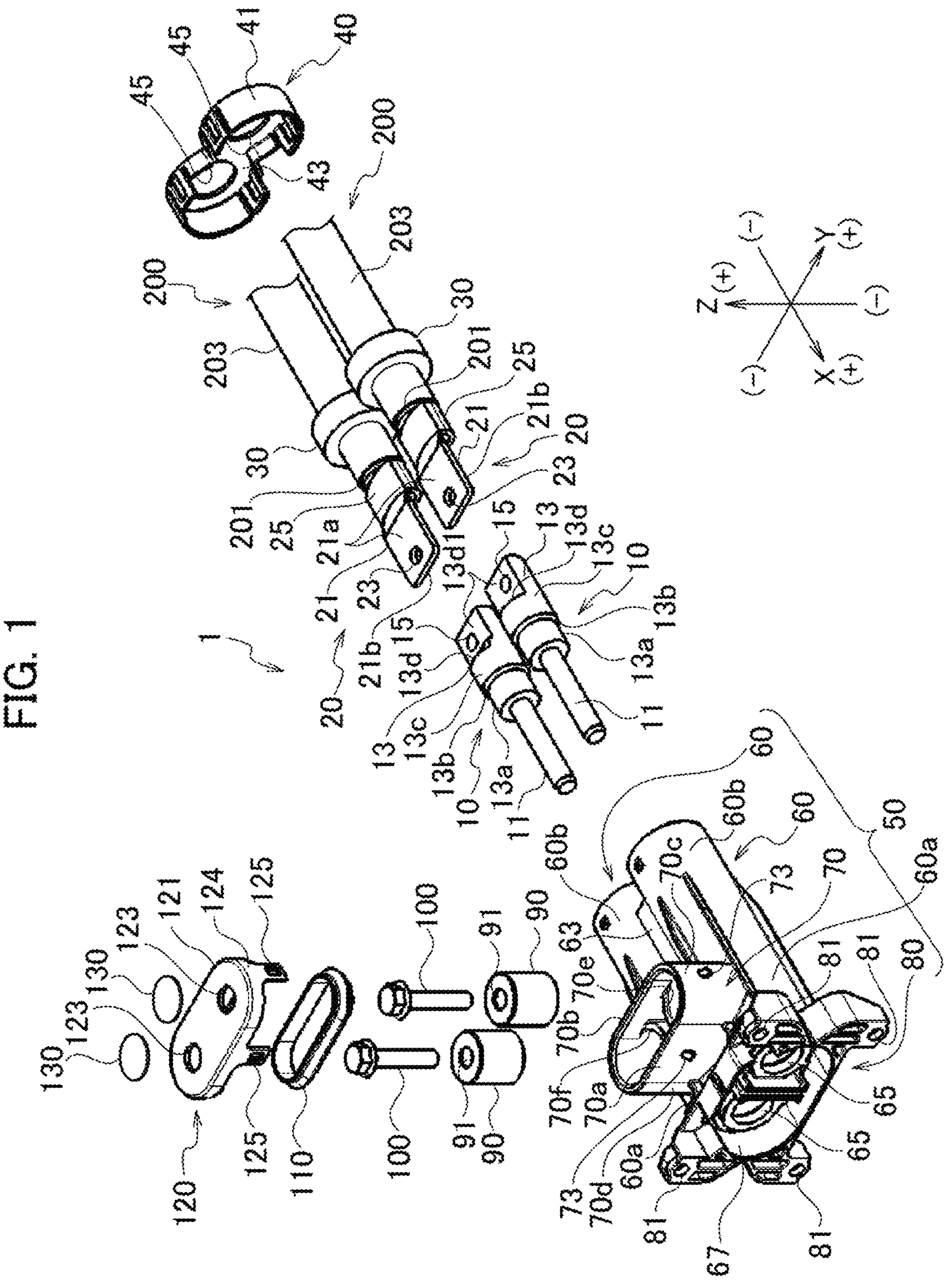
FIG. 1 is an exploded perspective view of a connector according to an embodiment.

A connector according to an embodiment will be described in detail below with reference to the drawings. Note that dimensional ratios in the drawings are exaggerated for convenience of description, and may be different from actual ratios. In addition, the same functions and components are labeled with the same or similar reference signs, and the description thereof will appropriately be omitted.

[Overall Configuration of Connector]

Figure 2:
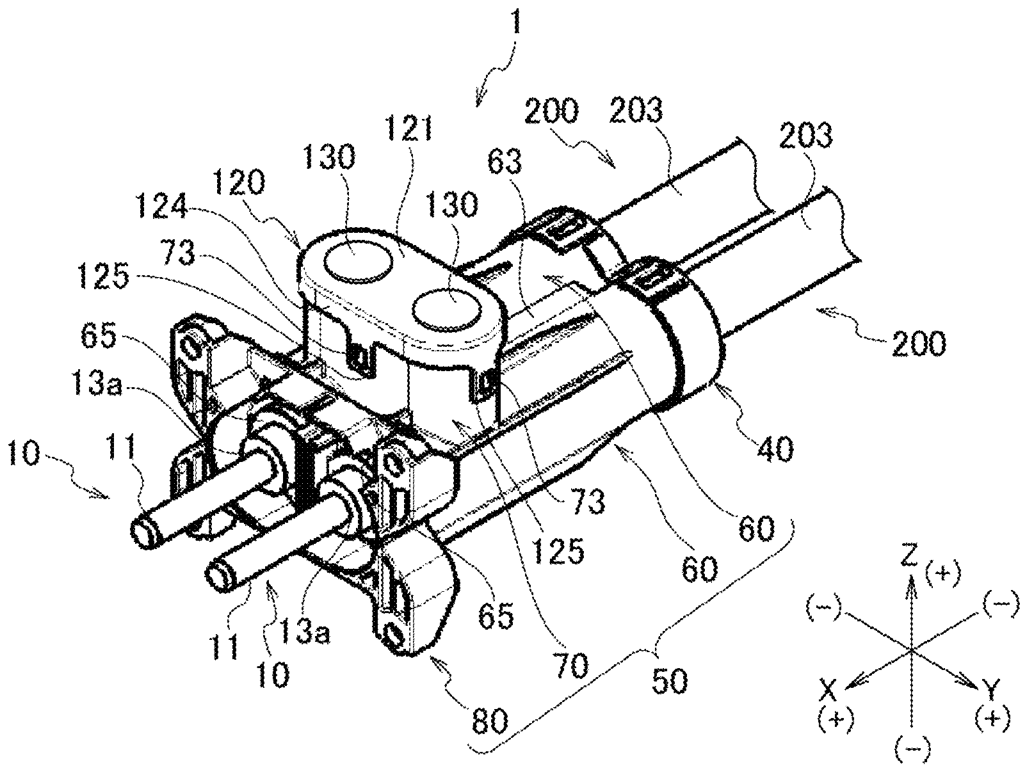
FIG. 2 is a perspective view of the connector according to the embodiment.
Figure 3:
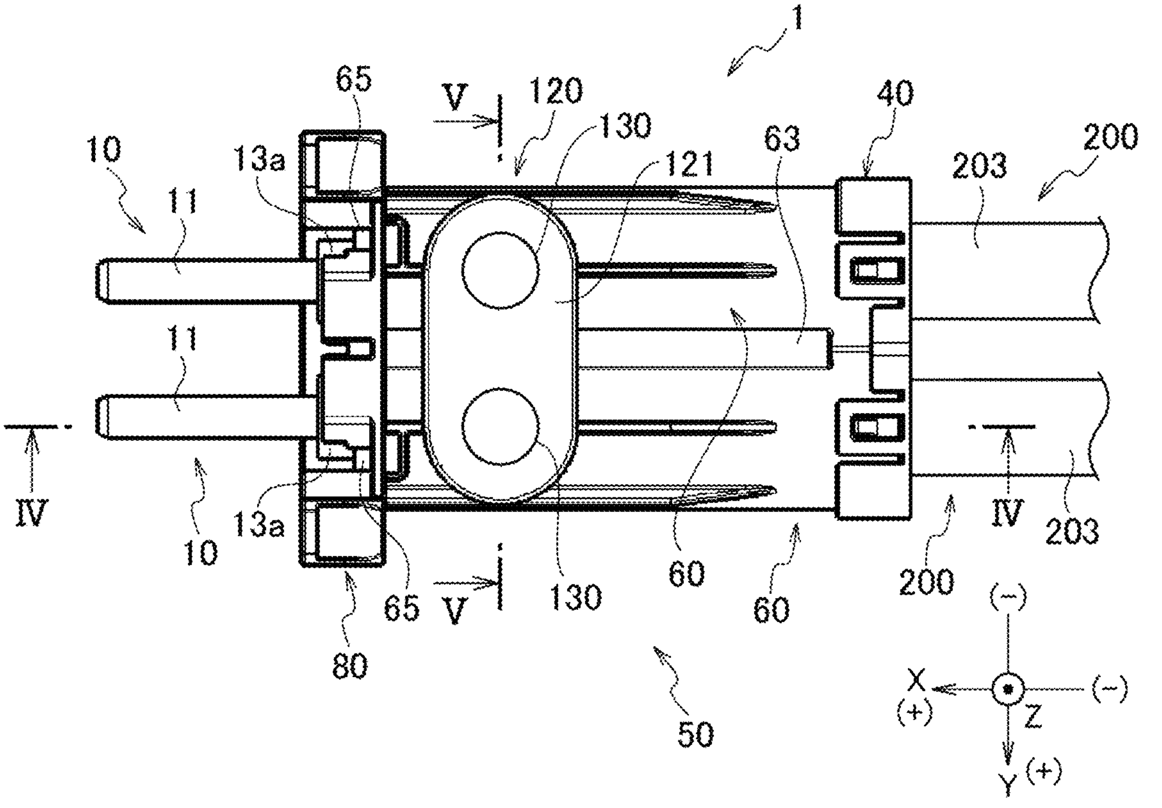
FIG. 3 is a plan view of the connector according to the embodiment.
Figure 4:
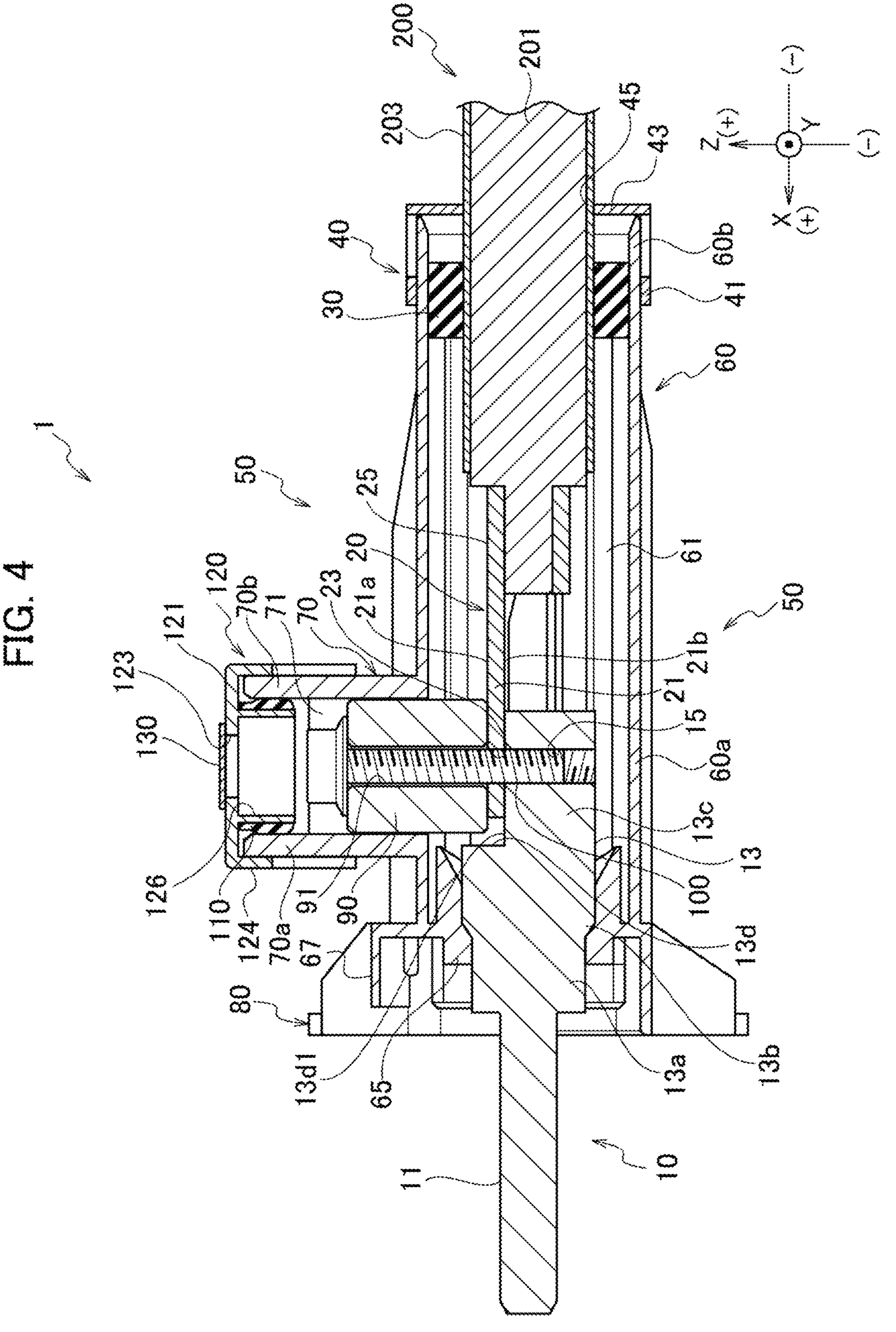
FIG. 4 is a cross-sectional view taken along line IV-IV in FIG. 3.
Figure 5:
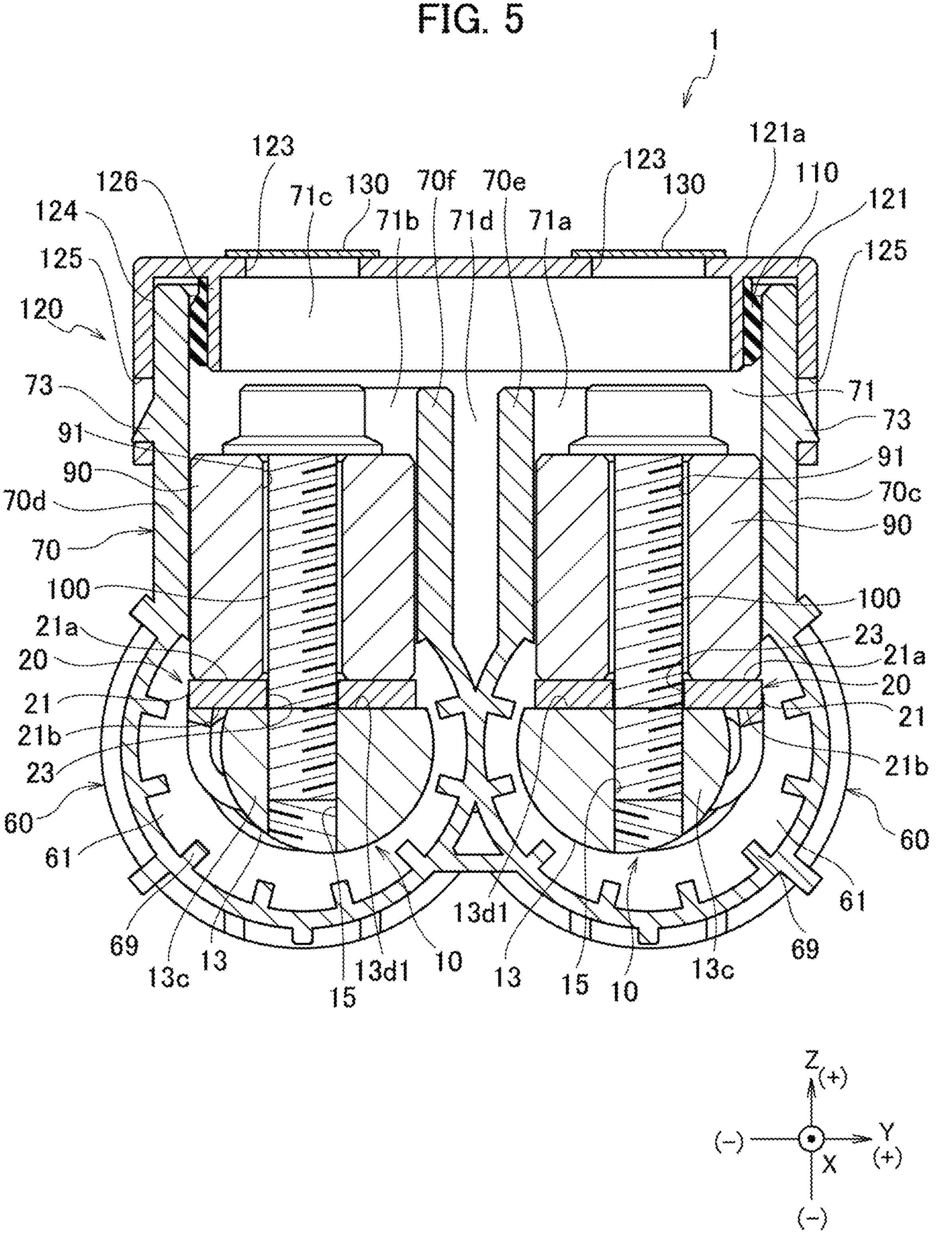
FIG. 5 is a cross-sectional view taken along line V-V in FIG. 3.

First, an overall configuration of a connector 1 will be described. FIG. 1 is an exploded perspective view of the connector 1. FIG. 2 is a perspective view of the connector 1. FIG. 3 is a plan view of the connector 1. FIG. 4 is a cross-sectional view taken along line IV-IV in FIG. 3; FIG. 5 is a cross-sectional view taken along line V-V in FIG. 3;

An X direction illustrated in FIGS. 1 to 5 corresponds to the longitudinal direction of the connector 1. The longitudinal direction of the connector 1 coincides with the fitting direction between the connector 1 and a mating connector (not illustrated). A Y direction illustrated in FIGS. 1 to 5 corresponds to the width direction of the connector 1 and is orthogonal to the X direction. A Z direction illustrated in FIGS. 1 to 5 corresponds to the height direction of the connector 1 and is orthogonal to the X direction and the Y direction.

A +X side and a −X side illustrated in FIGS. 1 to 5 correspond to the front side and the rear side of the connector 1, respectively. A +Y side and a −Y side illustrated in FIGS. 1 to 5 correspond to the left side and the right side of the connector 1 toward the front side of the connector 1, respectively. A +Z side and a −Z side illustrated in FIGS. 1 to 5 correspond to the upper side and the lower side of the connector 1, respectively.

The connector 1 is attached to a vehicle on which a battery is mounted, such as an electric vehicle, and is connected to a cable extending from the battery. Specifically, cables 200 and 200 extending from the battery (not illustrated) mounted on the vehicle are connected to the rear end of the connector 1.

The cables 200 and 200 include core wires 201 and 201 and insulating sheaths 203 and 203. The core wires 201 and 201 are covered with the insulating sheaths 203 and 203. At the ends of the cables 200 and 200, the insulating sheaths 203 and 203 are peeled off and the core wires 201 and 201 are exposed from the insulating sheaths 203 and 203.

When the connector 1 is fitted to the mating connector, a terminal of the connector 1 is electrically connected to a terminal (mating terminal) of the mating connector. As a result, electric power is supplied from the outside of the vehicle, and the battery is charged. Note that the connector 1 is also referred to as a charging inlet.

As illustrated in FIG. 1, the connector 1 includes power terminals 10 and 10, LA terminals 20 and 20, sealing members 30 and 30, a rear holder 40, a terminal holder 50, heat storage members 90 and 90, a packing 110, and a cover 120.

The power terminals 10 and 10 function as terminals of the connector 1 and are electrically connected to mating terminals. The LA terminals 20 and 20 are electrically connected to the cables 200 and 200. The LA terminals 20 and 20 are joined to the power terminals 10 and 10. Note that the power terminals 10 and 10 are also referred to as terminal connection units, and the LA terminals 20 and 20 are also referred to as cable connection units.

The connection portions between the power terminals 10 and 10 and the LA terminals 20 and 20 are housed in the terminal holder 50 and sealed by the sealing members 30 and 30. The rear holder 40 is attached to the terminal holder 50 and holds the cables 200 and 200 electrically connected to the LA terminals 20 and 20.

The heat storage members 90 and 90 are erected at the connection portions between the power terminals 10 and 10 and the LA terminals 20 and 20, and are housed in the terminal holder 50. The cover 120 is attached to the terminal holder 50 with the packing 110 interposed therebetween, and sheathes the portion in which the heat storage members 90 and 90 are housed. As will be described later, the cover 120 includes vent holes 123 and 123 penetrating the cover 120, and the vent holes 123 and 123 are provided with vent films 130 and 130.

A configuration of each of the components included in the connector 1 will be described below sequentially.

[Configuration of Power Terminal]

First, configurations of the power terminals 10 and 10 will be described. The power terminals 10 and 10 are made of metal and extend in the longitudinal direction (X direction) of the connector 1. The power terminals 10 and 10 include terminal units 11 and 11, base portions 13 and 13, and screw holes 15 and 15 (refer to FIG. 1).

In a state where the power terminals 10 and 10 are attached to the terminal holder 50, the terminal units 11 and 11 protrude forward from the front end of the terminal holder 50 (refer to FIGS. 2 and 3). One of the terminal units 11 and 11 functions as a terminal on the positive pole side, and the other of the terminal units 11 and 11 functions as a terminal on the negative pole side. When the connector 1 is fitted to the mating connector, one of the terminal units 11 and 11 is electrically connected to the mating terminal on the positive pole side, and the other of the terminal units 11 and 11 is electrically connected to the mating terminal on the negative pole side. As a result, the power terminals 10 and 10 are electrically connected to the mating terminals.

The base portions 13 and 13 include small diameter portions 13*a* and 13*a*, diameter extending portions 13*b* and 13*b*, large diameter portions 13*c* and 13*c*, and cutout portions 13*d* and 13*d*. The small diameter portions 13*a* and 13*a* each have a columnar shape. At the front ends of the small diameter portions 13*a* and 13*a*, the terminal units 11 and 11 protruding forward are integrally provided. At the rear ends of the small diameter portions 13*a* and 13*a*, the diameter extending portions 13*b* and 13*b* are integrally provided. The diameter extending portions 13*b* and 13*b* each have a truncated conical shape. At the rear ends of the diameter extending portions 13*b* and 13*b*, the large diameter portions 13*c* and 13*c* are integrally provided. Note that the diameter extending portions 13*b* and 13*b* may each have a columnar shape.

The large diameter portions 13*c* and 13*c* each have a columnar shape. At the upper rear ends of the large diameter portions 13*c* and 13*c*, the cutout portions 13*d* and 13*d* are formed. The cutout portions 13*d* and 13*d* include contact surfaces 13*d*1 and 13*d*1 facing upward. The contact surfaces 13*d*1 and 13*d*1 are parallel to the X-Y plane. At the rear ends of the large diameter portions 13*c* and 13*c*, screw holes 15 and 15 are formed. The screw holes 15 and 15 are opened at the contact surfaces 13*d*1 and 13*d*1 of the cutout portions 13*d* and 13*d*.

[Configuration of LA Terminal]

Next, configurations of the LA terminals 20 and 20 will be described. The LA terminals 20 and 20 are made of metal and extend in the longitudinal direction (X direction) of the connector 1. The LA terminals 20 and 20 include terminal units 21 and 21, through holes 23 and 23, and crimped portions 25 and 25 (refer to FIG. 1).

The terminal units 21 and 21 each have a plate shape and include heat absorbing surfaces 21*a* and 21*a* and contact surfaces 21*b* and 21*b*. The heat absorbing surfaces 21*a* and 21*a* face upward and correspond to the upper surfaces of the terminal units 21 and 21. The contact surfaces 21*b* and 21*b* face downward and correspond to the lower surfaces of the terminal units 21 and 21. The heat absorbing surfaces 21*a* and 21*a* and the contact surfaces 21*b* and 21*b* are parallel to the X-Y plane. The through holes 23 and 23 penetrate the terminal units 21 and 21 and are opened at the heat absorbing surfaces 21*a* and 21*a* and the contact surfaces 21*b* and 21*b*.

In a state where the power terminals 10 and 10 and the LA terminals 20 and 20 are attached to the terminal holder 50, the contact surfaces 21*b* and 21*b* of the terminal units 21 and 21 contact the contact surfaces 13*d*1 and 13*dl* of the cutout portions 13*d* and 13*d* of the power terminals 10 and 10. In this state, the through holes 23 and 23 communicate with the screw holes 15 and 15 of the power terminals 10 and 10. The portions at which the contact surfaces 21*b* and 21*b* of the terminal units 21 and 21 are brought into contact with the contact surfaces 13*dl* and 13*dl* of the cutout portions 13*d* and 13*d* of the power terminals 10 and 10 correspond to the connection portions between the power terminals 10 and 10 and the LA terminals 20 and 20.

In a state where the power terminals 10 and 10 and the LA terminals 20 and 20 are attached to the terminal holder 50, the heat storage members 90 and 90 are erected on the heat absorbing surfaces 21*a* and 21*a* of the terminal units 21 and 21 as will be described later.

At the rear ends of the terminal units 21 and 21, the crimped portions 25 and 25 are integrally provided. The crimped portions 25 and 25 are crimped on the core wires

201 and 201 exposed from the insulating sheaths 203 and 203 at the ends of the cables 200 and 200. As a result, the LA terminals 20 and 20 are electrically connected to the cables 200 and 200.

[Configuration of Sealing Member]

Next, configurations of the sealing members 30 and 30 will be described. The sealing members 30 and 30 each have an annular shape and are provided around the insulating sheaths 203 and 203 of the cables 200 and 200 (refer to FIG. 1). The sealing members 30 and 30 are, for example, rubber plugs.

In a state where the power terminals 10 and 10 and the LA terminals 20 and 20 are attached to the terminal holder 50, the sealing members 30 and 30 are sandwiched between the cables 200 and 200 and the terminal holder 50 (refer to FIG. 4). As a result, the connection portions between the power terminals 10 and 10 and the LA terminals 20 and 20 are sealed by the sealing members 30 and 30.

[Configuration of Rear Holder]

Next, a configuration of the rear holder 40 will be described. The rear holder 40 includes a tubular portion 41, a cover portion 43, and cable insertion holes 45 and 45 (refer to FIG. 1).

The tubular portion 41 extends in the longitudinal direction (X direction) of the connector 1. The shape of the inner peripheral surface of the tubular portion 41 is formed to correspond to the shape of the outer peripheral surface of rear end portions 60*b* and 60*b* of first housing portions 60 and 60, which will be described later, in the terminal holder 50. With this configuration, in a state where the rear holder 40 is attached to the terminal holder 50, the tubular portion 41 sheathes the rear end portions 60*b* and 60*b* of the first housing portions 60 and 60.

The cover portion 43 closes the rear end opening of the tubular portion 41. The cover portion 43 has the cable insertion holes 45 and 45 penetrate therethrough. In a state where the rear holder 40 is attached to the terminal holder 50, the cables 200 and 200 electrically connected to the LA terminals 20 and 20 are inserted into the cable insertion holes 45 and 45 and held by the rear holder 40 (refer to FIG. 4). In addition, in a state where the rear holder 40 is attached to the terminal holder 50, the rear end openings of the first housing portions 60 and 60 of the terminal holder 50 are closed by the cover portion 43 of the rear holder 40.

[Configuration of Terminal Holder]

Next, a configuration of the terminal holder 50 will be described. The terminal holder 50 includes the first housing portions 60 and 60, a second housing portion 70, and an attachment portion 80 (refer to FIG. 1).

The first housing portions 60 and 60 extend in the longitudinal direction (X direction) of the connector 1. The first housing portions 60 and 60 are connected to each other by a connection portion 63 and arranged side by side in the width direction (Y direction) of the connector 1 (refer to FIGS. 2 and 3).

The first housing portions 60 and 60 each have a tubular shape and have first housing spaces 61 and 61 therein (refer to FIGS. 4 and 5). The first housing spaces 61 and 61 house therein the diameter extending portions 13*b* and 13*b* and the large diameter portions 13*c* and 13*c* of the power terminals 10 and 10, the LA terminals 20 and 20, and the terminal portions of the cables 200 and 200 electrically connected to the LA terminals 20 and 20. The terminal portions of the cables 200 and 200 correspond to portions between the tip ends of the core wires 201 and 201 exposed from the insulating sheaths 203 and 203 and the vicinity of the attachment positions where the sealing members 30 and 30 are provided to the insulating sheaths 203 and 203 (refer to FIG. 4). With this configuration, the connection portions between the power terminals 10 and 10 and the LA terminals 20 and 20 are housed in the first housing spaces 61 and 61 of the first housing portions 60 and 60.

In the front end openings of the first housing portions 60 and 60, cylindrical terminal holding portions 65 and 65 are inserted (refer to FIG. 4). The terminal holding portions 65 and 65 are formed integrally with the first housing portions 60 and 60. The shapes of the inner peripheral surfaces of the terminal holding portions 65 and 65 are formed to correspond to the shapes of the outer peripheral surfaces of the rear end portions of the small diameter portions 13*a* and 13*a*, the diameter extending portions 13*b* and 13*b*, and the front end portions of the large diameter portions 13*c* and 13*c* in the base portions 13 and 13 of the power terminals 10 and 10. With this configuration, in a state of housing the power terminals 10 and 10 in the first housing portions 60 and 60, the terminal holding portions 65 and 65 hold the power terminals 10 and 10.

In a state where the terminal holding portions 65 and 65 hold the power terminals 10 and 10, the terminal units 11 and 11 and the front end portions of the small diameter portions 13*a* and 13*a* protrude forward from the terminal holding portions 65 and 65. Note that, in the terminal holding portions 65 and 65, portions that hold the rear end portions of the small diameter portions 13*a* and 13*a* are located further on the front side than the front end openings of the first housing portions 60 and 60.

At the front ends of the first housing portions 60 and 60, a hood portion 67 is provided (refer to FIG. 4). The hood portion 67 is formed integrally with the first housing portions 60 and 60. The hood portion 67 extends forward from the front end outer peripheries of the first housing portions 60 and 60 and surrounds the terminal holding portions 65 and 65.

The first housing portions 60 and 60 include front end portions 60*a* and 60*a* and rear end portions 60*b* and 60*b* (refer to FIG. 1). As will be described later, the front end portions 60*a* and 60*a* are provided with the second housing portion 70. To the rear end portions 60*b* and 60*b*, the rear holder 40 is attached.

The power terminals 10 and 10 and the LA terminals 20 and 20 are inserted from the rear end openings of the first housing portions 60 and 60 and provided in the first housing spaces 61 and 61. In this state, the sealing members 30 and 30 are sandwiched between the insulating sheaths 203 and 203 of the cables 200 and 200 and the rear end portions 60*b* and 60*b* of the first housing portions 60 and 60 (refer to FIG. 4).

In a state where the rear holder 40 is attached to the rear end portions 60*b* and 60*b*, the tubular portion 41 of the rear holder 40 sheathes the rear end portions 60*b* and 60*b* of the first housing portions 60 and 60, and the cover portion 43 of the rear holder 40 closes the rear end openings of the first housing portions 60 and 60 while holding the cables 200 and 200.

In this manner, the front end openings of the first housing portions 60 and 60 are closed by the power terminals 10 and 10 and the terminal holding portions 65 and 65, and the rear end openings of the first housing portions 60 and 60 are closed by the rear holder 40 and the cables 200 and 200. Also, the first housing spaces 61 and 61 are sealed by sealing members 30 and 30. Accordingly, the first housing spaces 61 and 61 are isolated from the outside.

On the inner peripheral surfaces of the first housing portions 60 and 60, a plurality of ribs 69 and 69 are formed along the longitudinal direction (X direction) of the connector 1 in order to reinforce the first housing portions 60 and 60 (refer to FIG. 5). In a cross-sectional view perpendicular to the longitudinal direction (X direction) of the connector 1, the plurality of ribs 69 and 69 protrude from the inner peripheral surfaces of the first housing portions 60 and 60 toward the inner side in the inner diameter direction of the first housing portions 60 and 60 in the first housing spaces 61 and 61.

The second housing portion 70 extends in the height direction (Z direction) of the connector 1. The second housing portion 70 is formed integrally with the first housing portions 60 and 60, and is erected on the front end portions 60*a* and 60*a* of the first housing portions 60 and 60 (refer to FIG. 1).

The second housing portion 70 has a tubular shape and includes flat walls 70*a* and 70*b* and arc walls 70*c* and 70*d*. The flat walls 70*a* and 70*b* form the front portion and the rear portion of the second housing portion 70, and the arc walls 70*c* and 70*d* form the left portion and the right portion of the second housing portion 70. One end and the other end of the flat wall 70*a* are connected to one end of the arc wall 70*c* and one end of the arc wall 70*d*, respectively. One end and the other end of the flat wall 70*b* are connected to the other end of the arc wall 70*c* and the other end of the arc wall 70*d*, respectively.

The second housing portion 70 has a second housing space 71 therein (refer to FIGS. 4 and 5). The second housing portion 70 has curved walls 70*e* and 70*f* in the second housing space 71 (refer to FIG. 1). The curved walls 70*e* and 70*f* are lower than the flat walls 70*a* and 70*b* and the arc walls 70*c* and 70*d*. In the second housing space 71, the inner peripheral surface of the arc wall 70*c* and the inner peripheral surface of the curved wall 70*e* are continuously connected to each other, and the inner peripheral surface of the arc wall 70*d* and the inner peripheral surface of the curved wall 70*f* are continuously connected to each other.

With this configuration, the second housing space 71 includes a space 71*a* surrounded by the inner peripheral surface of the arc wall 70*c* and the inner peripheral surface of the curved wall 70*e*, and a space 71*b* surrounded by the inner peripheral surface of the arc wall 70*d* and the inner peripheral surface of the curved wall 70*f* (refer to FIG. 5). Also, the second housing space 71 includes a space 71*c* surrounded by the inner peripheral surfaces of the flat walls 70*a* and 70*b* and the inner peripheral surfaces of the arc walls 70*c* and 70*d* at the upper end portion of the second housing portion 70, and a space 71*d* surrounded by the outer peripheral surfaces of the curved walls 70*e* and 70*f* and the inner peripheral surfaces of the flat walls 70*a* and 70*b*. In the second housing space 71, the space 71*c* is located above the spaces 71*a*, 71*b*, and 71*d*.

The second housing space 71 communicates with the first housing spaces 61 and 61 via the lower end opening of the second housing portion 70. Specifically, in the second housing space 71, the spaces 71*a* and 71*b* communicate with the first housing spaces 61 and 61 via the lower end opening of the second housing portion 70. The lower side of the space 71*d* is closed by the outer peripheral surfaces of the first housing portions 60 and 60.

In the second housing space 71, the heat storage members 90 and 90 are housed. Specifically, in the second housing space 71, the heat storage members 90 and 90 are housed in the spaces 71*a* and 71*b*.

On the outer peripheral surfaces of the flat walls 70*a* and 70*b* and the arc walls 70*c* and 70*d*, locking pieces 73 are provided to protrude, respectively. When the cover 120 is attached to the terminal holder 50, the locking pieces 73 are inserted into catching holes 125 of the cover 120 which will be described later, respectively. As a result, the cover 120 is locked to the second housing portion 70 and sheathes the upper end opening of the second housing portion 70.

The attachment portion 80 is provided at the front ends of the first housing portions 60 and 60 and is located outside of the hood portion 67 (refer to FIG. 1). Attachment holes 81 penetrate the upper left portion, the lower left portion, the upper right portion, and the lower right portion of the attachment portion 80 along the longitudinal direction of the connector 1, respectively.

[Configuration of Heat Storage Member]

The heat storage members 90 and 90 are members used to temporarily store heat. The heat storage members 90 and 90 contain, for example, a material having a larger heat capacity than that of air.

The heat storage members 90 and 90 each have a columnar shape. In a state where the power terminals 10 and 10 and the LA terminals 20 and 20 are attached to the terminal holder 50, the heat storage members 90 and 90 are inserted into the second housing space 71 from the upper end opening of the second housing portion 70, and are housed in the spaces 71*a* and 71*b* in the second housing space 71. In this state, the lower end portions of the heat storage members 90 and 90 are introduced into the first housing spaces 61 and 61 through the lower end opening of the second housing portion 70. As a result, the heat storage members 90 and 90 are erected at the connection portions between the power terminals 10 and 10 and the LA terminals 20 and 20. In this state, the lower ends of the heat storage members 90 and 90 are in contact with the heat absorbing surfaces 21*a* and 21*a* of the LA terminals 20 and 20 (refer to FIGS. 4 and 5).

In the heat storage members 90 and 90, through holes 91 and 91 are formed. In a state where the heat storage members 90 and 90 are housed in the spaces 71*a* and 71*b* and erected at the connection portions between the power terminals 10 and 10 and the LA terminals 20 and 20, bolts 100 and 100 are inserted into the through holes 91 and 91 of the heat storage members 90 and 90. When the bolts 100 and 100 are inserted into the through holes 91 and 91 of the heat storage members 90 and 90, the bolts 100 and 100 are introduced into the screw holes 15 and 15 of the power terminals 10 and 10 via the through holes 23 and 23 of the LA terminals 20 and 20. In this state, the bolts 100 and 100 are screwed into the screw holes 15 and 15 of the power terminals 10 and 10 to fasten and fix the heat storage members 90 and 90 to the connection portions between the power terminals 10 and 10 and the LA terminals 20 and 20. In this manner, the power terminals 10 and 10, the LA terminals 20 and 20, and the heat storage members 90 and 90 are fastened together by the bolts 100 and 100. Note that the bolts 100 and 100 are also referred to as fastening members.

[Configuration of Packing]

Next, a configuration of the packing 110 will be described. In a state where the cover 120 is locked to the second housing portion 70, the packing 110 is sandwiched between the second housing portion 70 and the cover 120 (refer to FIGS. 4 and 5). Specifically, the packing 110 is pressed by an inner wall portion 126 of the cover 120 which will be described later, and pressed against the inner peripheral surface of the upper end portion of the second housing portion 70. With this configuration, it is possible to prevent water from entering the second housing space 71 from the outside.

The packing 110 has a thickness to have a pressing margin assumed in advance to be required in a state of being sandwiched between the second housing portion 70 and the cover 120.

[Configuration of Cover]

Next, a configuration of the cover 120 will be described. The cover 120 has a tubular shape and includes a main body portion 121, an outer wall portion 124, the inner wall portion 126, and the vent films 130 and 130 (refer to FIGS. 1, 4, and 5). In a state where the cover 120 is locked to the second housing portion 70, the main body portion 121 sheathes the upper end opening of the second housing portion 70.

The main body portion 121 is provided with the vent holes 123 and 123 penetrating the main body portion 121. In a state where the cover 120 is locked to the second housing portion 70, the vent holes 123 and 123 communicate with the space 71*c* in the second housing space 71. In this state, the vent holes 123 and 123 are located above the spaces 71*a* and 71*b* in the second housing space 71.

The outer wall portion 124 is provided along the peripheral edge of the main body portion 121 and extends downward from the peripheral edge. At the front portion, the rear portion, the left portion, and the right portion of the outer wall portion 124, protrusions extending downward from the outer wall portion 124 are provided, respectively. The catching holes 125 penetrate the protrusions, respectively. When the locking pieces 73 of the second housing portion 70 are inserted into the catching holes 125 of the cover 120, the cover 120 is locked to the second housing portion 70 and attached to the terminal holder 50.

The inner wall portion 126 is provided along the outer wall portion 124 and extends downward from a position further on the inner side than the peripheral edge of the main body portion 121. In a state where the cover 120 is locked to the second housing portion 70, the inner wall portion 126 is inserted into the upper end opening of the second housing portion 70 and surrounds a part of the space 71*c* of the second housing space 71.

The vent films 130 and 130 are provided to the vent holes 123 and 123 to allow gas to pass through the vent holes 123 and 123 and to prevent liquid from passing through the vent holes 123 and 123. The vent films 130 and 130 are porous films made of, for example, a fluororesin, a polyolefin resin, or the like. In the present embodiment, the vent films 130 and 130 are attached to (stuck on) an upper surface 121*a* of the main body portion 121 to sheathe the openings of the vent holes 123 and 123.

The configuration of each of the components included in the connector 1 has been described above.

[Connector Assembling Procedure]

Next, a procedure for assembling the connector 1 will be described. First, the power terminals 10 and 10 are inserted into the terminal holder 50. Specifically, the power terminals 10 and 10 are inserted into the first housing spaces 61 and 61 of the first housing portions 60 and 60 from the rear end openings of the first housing portions 60 and 60. The power terminals 10 and 10 are inserted into the first housing spaces 61 and 61 until the terminal units 11 and 11 and the front end portions of the small diameter portions 13*a* and 13*a* of the base portions 13 and 13 of the power terminals 10 and 10 protrude forward from the terminal holding portions 65 and 65. In this state, the rear end portions of the small diameter portions 13*a* and 13*a*, the diameter extending portions 13*b* and 13*b*, and the front end portions of the large diameter portions 13*c* and 13*c* of the base portions 13 and 13 are held by the terminal holding portions 65 and 65. As a result, the power terminals 10 and 10 are attached to the terminal holder 50.

After the power terminals 10 and 10 are attached to the terminal holder 50, the LA terminals 20 and 20 to which the cables 200 and 200 are electrically connected are inserted into the terminal holder 50. Specifically, the LA terminals 20 and 20 are inserted into the first housing spaces 61 and 61 of the first housing portions 60 and 60 from the rear end openings of the first housing portions 60 and 60. The LA terminals 20 and 20 are inserted into the first housing spaces 61 and 61 until the contact surfaces 21*b* and 21*b* of the terminal units 21 and 21 of the LA terminals 20 and 20 contact the contact surfaces 13*d*1 and 13*dl* of the cutout portions 13*d* and 13*d* of the power terminals 10 and 10 and the through holes 23 and 23 of the terminal units 21 and 21 communicate with the screw holes 15 and 15 of the power terminals 10 and 10. In this state, the LA terminals 20 and 20 are housed in the first housing spaces 61 and 61, and the sealing members 30 and 30 are sandwiched between the cables 200 and 200 and the terminal holder 50. As a result, the LA terminals 20 and 20 are attached to the terminal holder 50.

In a state where the power terminals 10 and 10 and the LA terminals 20 and 20 are attached to the terminal holder 50, the connection portions between the power terminals 10 and 10 and the LA terminals 20 and 20 are housed in the first housing spaces 61 and 61 and sealed by the sealing members 30 and 30.

After the LA terminals 20 and 20 are attached to the terminal holder 50, the rear holder 40 is attached to the terminal holder 50. Specifically, in a state where the cables 200 and 200 electrically connected to the LA terminals 20 and 20 are inserted into the cable insertion holes 45 and 45, the rear holder 40 is attached to the rear end portions 60*b* and 60*b* of the first housing portions 60 and 60. In a state where the rear holder 40 is attached to the rear end portions 60*b* and 60*b*, the tubular portion 41 of the rear holder 40 sheathes the rear end portions 60*b* and 60*b* of the first housing portions 60 and 60, and the cover portion 43 of the rear holder 40 closes the rear end openings of the first housing portions 60 and 60.

After the rear holder 40 is attached to the terminal holder 50, the heat storage members 90 and 90 are housed in the terminal holder 50. Specifically, the heat storage members 90 and 90 are inserted into the second housing space 71 from the upper end opening of the second housing portion 70, and are housed in the spaces 71*a* and 71*b* in the second housing space 71. In a state where the heat storage members 90 and 90 are housed in the spaces 71*a* and 71*b*, the lower end portions of the heat storage members 90 and 90 are introduced into the first housing spaces 61 and 61. As a result, the heat storage members 90 and 90 are erected at the connection portions between the power terminals 10 and 10 and the LA terminals 20 and 20.

After the heat storage members 90 and 90 are erected at the connection portions between the power terminals 10 and 10 and the LA terminals 20 and 20, the bolts 100 and 100 are inserted into the through holes 91 and 91 of the heat storage members 90 and 90. Thereafter, the bolts 100 and 100 are introduced into the screw holes 15 and 15 of the power terminals 10 and 10 via the through holes 23 and 23 of the LA terminals 20 and 20. In this state, the bolts 100 and 100 are screwed into the screw holes 15 and 15 of the power terminals 10 and 10 to fix the heat storage members 90 and 90 to the connection portions between the power terminals

10 and 10 and the LA terminals 20 and 20. As a result, the heat storage members 90 and 90 are housed in the terminal holder 50.

After the heat storage members 90 and 90 are housed in the terminal holder 50, the cover 120 is attached to the terminal holder 50 with the packing 110 interposed therebetween. Specifically, the locking pieces 73 of the second housing portion 70 are inserted into the catching holes 125 of the outer wall portion 124 of the cover 120, and the cover 120 is locked to the second housing portion 70.

In a state where the cover 120 is attached to the terminal holder 50, the outer wall portion 124 of the cover 120 sheathes the upper end portion of the second housing portion 70, and the main body portion 121 of the cover 120 sheathes the upper end opening of the second housing portion 70. Further, the inner wall portion 126 of the cover 120 is inserted into the upper end opening of the second housing portion 70, and presses the packing 110 toward the inner peripheral surface of the upper end portion of the second housing portion 70.

Note that, in a state where the cover 120 is attached to the terminal holder 50, the openings of the vent holes 123 and 123 of the main body portion 121 communicating with the second housing space 71 of the second housing portion 70 are sheathed with the vent films 130 and 130.

[Reduction in Increase of Temperature of Terminal]

Next, reduction in an increase of the temperature of the terminal in the connector 1 will be described. When the connector 1 is fitted to the mating connector, the power terminals 10 and 10 are electrically connected to the mating terminals. As a result, electric power is supplied from the outside of the vehicle, and the battery is charged. At this time, heat is generated at contact portions between the terminal units 11 and 11 of the power terminals 10 and 10 and terminal units (not illustrated) of the mating terminals. The heat generated at the contact portions is conducted to the connection portions between the power terminals 10 and 10 and the LA terminals 20 and 20 via the terminal units 11 and 11 and the base portions 13 and 13 of the power terminals 10 and 10.

The heat storage members 90 and 90 are erected at the connection portions between the power terminals 10 and 10 and the LA terminals 20 and 20. Therefore, the heat storage members 90 and 90 absorb and temporarily store the heat conducted to the connection portions between the power terminals 10 and 10 and the LA terminals 20 and 20.

The heat absorbed by the heat storage members 90 and 90 moves to the upper side of the second housing space 71 by natural convection in the second housing space 71 of the second housing portion 70 in which the heat storage members 90 and 90 are housed. The heat moved to the upper side of the second housing space 71 is dissipated to the outside of the second housing portion 70 through the vent holes 123 and 123 formed in the main body portion 121 of the cover 120.

Therefore, the heat storage members 90 and 90 can continuously absorb the heat conducted to the connection portions between the power terminals 10 and 10 and the LA terminals 20 and 20. Accordingly, the connector 1 can effectively reduce an increase of the temperature of the power terminals 10 and 10. In addition, the connector 1 can inhibit heat from being conducted from the power terminals 10 and 10 to the LA terminals 20 and 20, and can effectively reduce an increase of the temperature of the LA terminals 20 and 20.

[Action and Effect]

According to the present embodiment, the connector 1 includes the power terminals 10 and 10, the LA terminals 20 and 20, the first housing portions 60 and 60, the second housing portion 70, the heat storage members 90 and 90, and the cover 120. The power terminals 10 and 10 are to be electrically connected to the mating terminals. The LA terminals 20 and 20 are to be electrically connected to the cables 200 and 200. The first housing portions 60 and 60 include first housing spaces 61 and 61 that house the connection portions between the power terminals 10 and 10 and the LA terminals 20 and 20. The heat storage members 90 and 90 are erected at the connection portions between the power terminals 10 and 10 and the LA terminals 20 and 20. The second housing portion 70 has a tubular shape. The second housing portion 70 includes the second housing space 71 that communicates with the first housing spaces 61 and 61 and houses the heat storage members 90 and 90. The cover 120 sheathes the upper end opening of the second housing portion 70.

The cover 120 includes the main body portion 121 and the vent films 130 and 130. The main body portion 121 has the vent holes 123 and 123 that penetrate the cover 120 and communicate with the second housing space 71. The vent films 130 and 130 are provided to the vent holes 123 and 123 to allow gas to pass through the vent holes 123 and 123 and to prevent liquid from passing through the vent holes 123 and 123.

With the above-described configuration, heat generated at the contact portions between the power terminals 10 and 10 and the mating terminals at the time of power distribution is conducted to the connection portions between the power terminals 10 and 10 and the LA terminals 20 and 20. The heat storage members 90 and 90 are erected at the connection portions between the power terminals 10 and 10 and the LA terminals 20 and 20. Therefore, the heat storage members 90 and 90 absorb and temporarily store the heat conducted to the connection portions between the power terminals 10 and 10 and the LA terminals 20 and 20.

The heat absorbed by the heat storage members 90 and 90 moves to the upper side of the second housing space 71 by natural convection in the second housing space 71 of the second housing portion 70 in which the heat storage members 90 and 90 are housed. The heat moved to the upper side of the second housing space 71 is dissipated to the outside of the second housing portion 70 through the vent holes 123 and 123 formed in the main body portion 121 of the cover 120.

Accordingly, it is possible to prevent heat from being accumulated in the second housing space 71 in which the heat storage members 90 and 90 are housed and to prevent the heat capacities of the heat storage members 90 and 90 from being saturated in a short time. Therefore, the heat storage members 90 and 90 can continuously absorb the heat conducted to the connection portions between the power terminals 10 and 10 and the LA terminals 20 and 20. Accordingly, the connector 1 can effectively reduce an increase of the temperature of the power terminals 10 and 10 at the time of power distribution. In addition, the connector 1 can inhibit heat from being conducted from the power terminals 10 and 10 to the LA terminals 20 and 20, and can effectively reduce an increase of the temperature of the LA terminals 20 and 20 at the time of power distribution.

With the above-described configuration, the vent films 130 and 130 are provided to the vent holes 123 and 123. Therefore, the connector 1 can prevent liquid from entering the inside of the second housing portion 70 while releasing heat to the outside of the second housing portion 70 at the time of power distribution.

In addition, it is not necessary to thicken the component members of the terminal holder 50 so that the component members can withstand the internal pressure due to the thermal expansion, and it is not necessary to increase the pressing margin of the packing 110. Accordingly, the connector 1 can be reduced in size, weight, and manufacturing cost. Furthermore, the diameters of the cables 200 and 200 can be set to be smaller without the need for considering the temperature increase of the power terminals 10 and 10 and the LA terminals 20 and 20.

According to the present embodiment, the power terminals 10 and 10, the LA terminals 20 and 20, and the heat storage members 90 and 90 are fastened together by the bolts 100 and 100.

With the above-described configuration, it is possible to easily erect the heat storage members 90 and 90 at the connection portion between the power terminals 10 and 10 and the LA terminals 20 and 20 from the upper end opening of the second housing portion 70 while preventing the number of components and the number of operations from increasing. Therefore, the connector 1 can be reduced in size, weight, and manufacturing cost.

According to the present embodiment, the vent films 130 and 130 sheathe the openings of the vent holes 123 and 123.

With the above-described configuration, the vent films 130 and 130 can be provided to the vent holes 123 and 123 while preventing the number of components and the number of operations from increasing. Therefore, the connector 1 can be reduced in size, weight, and manufacturing cost.

First Modification Example

In the above-described embodiment, the vent films 130 and 130 are attached to the upper surface 121*a* of the main body portion 121 to sheathe the openings of the vent holes 123 and 123, but the present invention is not limited thereto.

Figure 6:
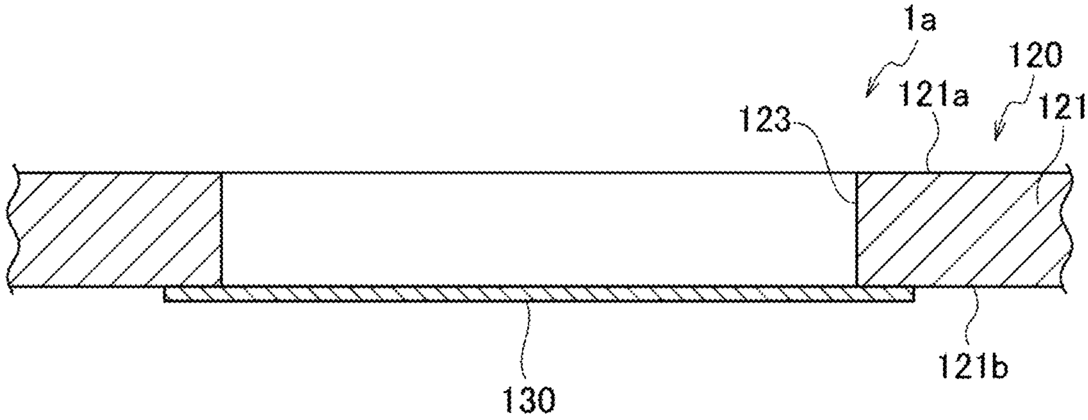
FIG. 6 is a cross-sectional view of a main part of the cover in a connector according to a first modification example of the embodiment.

FIG. 6 is a cross-sectional view of a main part of the cover 120 in a connector 1*a* according to the present modification example. As illustrated in FIG. 6, in the present modification example, each of the vent films 130 and 130 is attached to a lower surface 121*b* of the main body portion 121 to sheathe the opening of the vent hole 123. Note that, in FIG. 6, only one vent film 130 is illustrated.

With the above-described configuration as well, the vent films 130 and 130 can be provided to the vent holes 123 and 123 while preventing the number of components and the number of operations from increasing. Therefore, the connector 1 can be reduced in size, weight, and manufacturing cost.

Second Modification Example

In the embodiment and the first modification example described above, the vent films 130 and 130 are attached to the upper surface 121*a* or the lower surface 121*b* of the main body portion 121 to sheathe the openings of the vent holes 123 and 123, but the present invention is not limited thereto.

Figure 7:
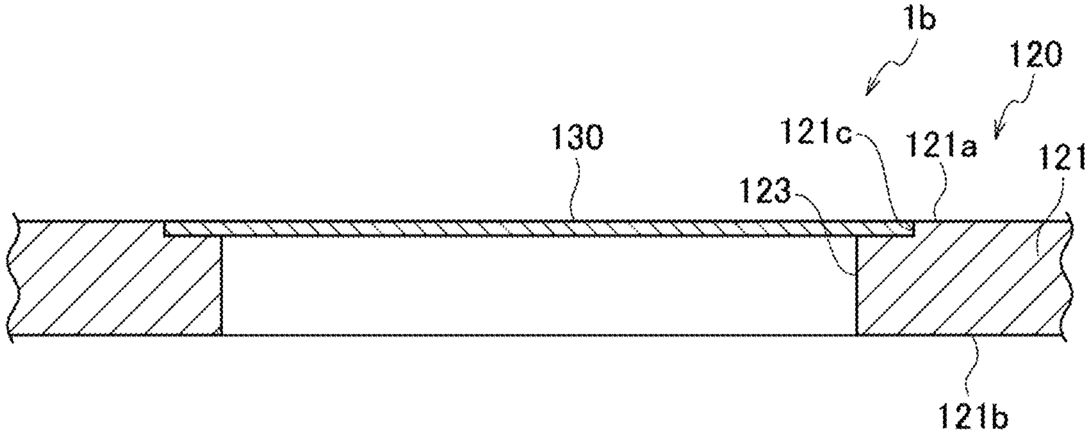
FIG. 7 is a cross-sectional view of a main part of the cover in a connector according to a second modification example of the embodiment.

FIG. 7 is a cross-sectional view of a main part of the cover 120 in a connector 1*b* according to the present modification example. As illustrated in FIG. 7, in the present modification example, circular receiving recesses 121*c* and 121*c* are formed on the upper surface 121*a* of the main body portion 121. Note that, in FIG. 7, only one receiving recess 121*c* is illustrated. The depth of the receiving recess 121*c* is substantially equal to the height of the vent film 130, and the diameter of the receiving recess 121*c* is substantially equal to the diameter of the vent film 130.

On the bottom surfaces of the receiving recesses 121*c* and 121*c*, the openings of the vent holes 123 and 123 are formed. The vent films 130 and 130 are received in the receiving recesses 121*c* and 121*c* and sheathe the openings of the vent holes 123 and 123. Note that the receiving recesses 121*c* and 121*c* are waterproofed.

With the above-described configuration, the vent films 130 and 130 sheathe the openings of the vent holes 123 and 123 in a state of being received in the receiving recesses 121*c* and 121*c* formed on the upper surface 121*a* of the main body portion 121. Therefore, for example, even in a case where a component present around the connector 1 interferes with the upper surface 121*a* of the main body portion 121, the vent films 130 and 130 are hardly peeled off from the main body portion 121 since the vent films 130 and 130 are not attached to the upper surface 121*a* of the main body portion 121 in an exposed manner.

Third Modification Example

In the above-described embodiment, the main body portion 121 of the cover 120 includes one member, but the present invention is not limited thereto.

Figure 8:
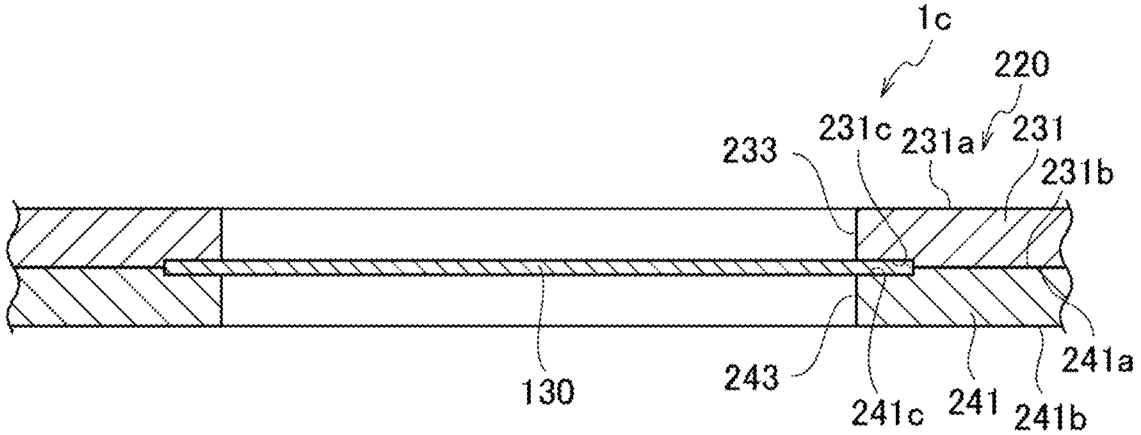
FIG. 8 is a cross-sectional view of a main part of a cover in a connector according to a third modification example of the embodiment.

FIG. 8 is a cross-sectional view of a main part of a cover 220 in a connector 1*c* according to the present modification example. As illustrated in FIG. 8, in the present modification example, the cover 220 includes a first main body part 231 and a second main body part 241 instead of the main body portion 121.

The first main body part 231 includes an upper surface 231*a* and a lower surface 231*b*. On the lower surface 231*b*, circular receiving recesses 231*c* and 231*c* are formed. Note that, in FIG. 8, only one receiving recess 231*c* is illustrated. The depth of the receiving recess 231*c* is substantially equal to half the height of the vent film 130, and the diameter of the receiving recess 231*c* is substantially equal to the diameter of the vent film 130. The lower surface 231*b* is also referred to as a first opposed surface.

In the first main body part 231, first holes 233 and 233 penetrating the first main body part 231 are formed. Note that, in FIG. 8, only one first hole 233 is illustrated. The upper openings and the lower openings of the first holes 233 and 233 are formed on the upper surface 231*a* and the bottom surfaces of the receiving recesses 231*c* and 231*c*, respectively.

Similarly, the second main body part 241 includes an upper surface 241*a* and a lower surface 241*b*. On the upper surface 241*a*, circular receiving recesses 241*c* and 241*c* are formed. Note that, in FIG. 8, only one receiving recess 241*c* is illustrated. The depth of the receiving recess 241*c* is substantially equal to half the height of the vent film 130, and the diameter of the receiving recess 241*c* is substantially equal to the diameter of the vent film 130. The upper surface 241*a* is also referred to as a second opposed surface.

In the second main body part 241, second holes 243 and 243 penetrating the second main body part 241 are formed. Note that, in FIG. 8, only one second hole 243 is illustrated. The upper openings and the lower openings of the second holes 243 and 243 are formed on the bottom surfaces of the receiving recesses 241*c* and 241*c* and the lower surface 241*b*, respectively.

In the cover 220, each of the vent films 130 and 130 is arranged between the first main body part 231 and the second main body part 241 and sheathes the lower opening of the first hole 233 and the upper opening of the second hole 243. Specifically, in a state where the lower portions of the vent films 130 and 130 are received in the receiving recesses 241*c* and 241*c* of the second main body part 241, the lower surface 231*b* of the first main body part 231 is joined to the upper surface 241*a* of the second main body part 241. In this state, the upper portions of the vent films 130 and 130 are received in the receiving recesses 231*c* and 231*c* of the first main body part 231. With such a configuration, the first holes 233 and 233 communicate with the second holes 243 and 243, and each of the vent films 130 and 130 sheathes the lower opening of the first hole 233 and the upper opening of the second hole 243.

Note that the first hole 233 and the second hole 243 communicating with each other form the vent hole of the above-described embodiment. In addition, the lower surface 231*b* and the receiving recesses 231*c* and 231*c* of the first main body part 231 and the upper surface 241*a* and the receiving recesses 241*c* and 241*c* of the second main body part 241 are waterproofed.

According to the present modification example, the main body portion of the connector 1*c* includes the first main body part 231 and the second main body part 241, and the vent holes of the connector 1*c* include the first holes 233 and 233 penetrating the first main body part 231 and the second holes 243 and 243 penetrating the second main body part 241. The vent films 130 and 130 are arranged between the first main body part 231 and the second main body part 241 and sheathe the openings of the first holes 233 and 233 and the openings of the second holes 243 and 243.

With such a configuration, since the vent films 130 and 130 are sandwiched between the first main body part 231 and the second main body part 241, the vent films 130 and 130 are more hardly peeled off from the main body portion of the connector 1*c*.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A connector comprising:

a terminal connection unit to be electrically connected to a mating terminal;

a cable connection unit to be electrically connected to a cable;

a first housing portion that includes a first housing space that houses a connection portion between the terminal connection unit and the cable connection unit;

a heat storage member that is erected at the connection portion;

a second housing portion having a tubular shape that includes a second housing space that communicates with the first housing space and houses the heat storage member; and a cover that sheathes an upper end opening of the second housing portion, wherein the cover includes a main body portion that has a vent hole that penetrates the cover and communicates with the second housing space, and a vent film that is provided to the vent hole, allows gas to pass through the vent hole, and prevents liquid from passing through the vent hole.

2. The connector according to claim 1, wherein the heat storage member, the terminal connection unit, and the cable connection unit are fastened together by a fastening member.

3. The connector according to claim 1, wherein the vent film sheathes an opening of the vent hole.

4. The connector according to claim 3, wherein a receiving recess is formed on an upper surface of the main body portion, wherein the opening of the vent hole is formed on a bottom surface of the receiving recess, and wherein the vent film is received in the receiving recess and sheathes the opening of the vent hole.

5. The connector according to claim 1, wherein the main body portion includes a first main body part and a second main body part, wherein the vent hole includes a first hole penetrating the first main body part and a second hole penetrating the second main body part, and wherein the vent film is arranged between the first main body part and the second main body part and sheathes an opening of the first hole and an opening of the second hole.

* * * * *